United States Patent [19]
Newell et al.

[11] Patent Number: 5,801,341
[45] Date of Patent: Sep. 1, 1998

[54] MECHANISM OF NOISE SUPPRESSION SYSTEM FOR A SUPERSONIC AIRCRAFT

[75] Inventors: John Keith Newell, Fontana; Gregory Richard Zwernemann, Anaheim Hills, both of Calif.

[73] Assignee: Northrop Grumman Corporation, Los Angeles, Calif.

[21] Appl. No.: 709,984

[22] Filed: Sep. 9, 1996

Related U.S. Application Data

[63] Continuation-in-part of Ser. No. 442,257, May 16, 1995, abandoned.

[51] Int. Cl.$^6$ .................. F02K 1/08; B64D 33/04
[52] U.S. Cl. .................. 181/215; 181/219; 239/265.13
[58] Field of Search .................. 181/213, 215, 181/216, 219, 220; 60/262; 239/265.13, 265.17, 265.19

[56] References Cited

U.S. PATENT DOCUMENTS

| | | |
|---|---|---|
| 2,637,164 | 5/1953 | Robson et al. . |
| 3,061,038 | 10/1962 | Lawler et al. ............... 181/215 |
| 3,248,878 | 5/1966 | Clark et al. . |
| 3,575,259 | 4/1971 | Watkinson . |
| 3,587,973 | 6/1971 | Wolf ............................ 239/265.13 |
| 3,614,037 | 10/1971 | Vdolek . |
| 3,618,700 | 11/1971 | Bond . |
| 3,670,964 | 6/1972 | Pedersen . |
| 3,721,314 | 3/1973 | Hoch et al. . |
| 4,353,516 | 10/1982 | Soligny et al. . |
| 4,501,393 | 2/1985 | Klees et al. . |
| 4,605,169 | 8/1986 | Mayers . |
| 4,805,401 | 2/1989 | Thayer et al. . |
| 5,154,052 | 10/1992 | Giffin, III et al. ............... 60/262 |
| 5,255,850 | 10/1993 | Cockerham . |

OTHER PUBLICATIONS

United States Statutory Invention Registration, Reg. No. H500, By Stogner et al., Published Aug. 2, 1988.

*Primary Examiner*—Khanh Dang
*Attorney, Agent, or Firm*—Terry J. Anderson; Karl J. Hoch, Jr.

[57] ABSTRACT

A noise suppression system for a jet engine of an aircraft having a device for blocking a flow of exhaust gases down the exhaust nozzle of the engine, and a device for separating the exhaust gases into a plurality of exhaust streams spaced a predetermined distance apart and having a smaller cross-sectional area than that of the original flow of exhaust gases. The separating device also directs the exhaust streams into the ambient air from points outside the periphery of a nacelle covering the engine. The aforementioned predetermined distance separating the exhaust streams, and the cross-sectional area of the exhaust streams, are chosen so that engine noise is shifted to a higher frequency spectrum than that of the original flow of exhaust gases, and then substantially dissipated within a short distance of the aircraft.

16 Claims, 5 Drawing Sheets

MECHANISM OF NOISE SUPPRESSION SYSTEM FOR A SUPERSONIC AIRCRAFT

RELATED APPLICATIONS

This application is a continuation-in-part of U.S. patent application Ser. No. 08/442,257 filed May 16, 1995, now abandoned, entitled SUPERSONIC AIRCRAFT EXHAUST NOISE SUPPRESSION SYSTEM by Gregory R. Zwernemann.

BACKGROUND OF THE INVENTION

1. Technical Field

This invention relates to noise suppression systems for jet engines, and more particularly, to jet engines for supersonic aircraft.

2. Background Art

Noise suppression to attenuate the noise produced by a jet engine had been generally accomplished by three broad techniques. Namely, internal mixing, partial external mixing, and the use of sound absorbing materials.

Internal mixing has involved introducing ambient air into the exhaust nozzle of a jet engine where it combines with the exhaust flow of the engine. This process accelerates the mixing of the exhaust gases with the ambient air, and is known to have a silencing effect. Many different devices have been used to accomplish this introduction of the ambient air into the nozzle. For instance, crossover tubes, blow-in flow doors and flaps of various types have been employed.

External mixing has involved bleeding off a small amount of the exhaust flow from inside the engine and deflecting it outside into the ambient air. Various mechanisms have been used to accomplish this bleeding off process. However, all essentially employ retractable scoops which penetrate the periphery of the exhaust flow. The small portion of the exhaust flow which is deflected outside the engine mixes with the ambient air. This external type of mixing is also know to reduce jet engine noise emissions.

Finally, it is known to line the surfaces impinged by the exhaust flow with acoustically treated sound absorbing materials. Some systems introduce additional acoustically treated surfaces into the exhaust flow during take-off and landing of the aircraft to further reduce noise levels.

Although current devices employing the aforementioned noise suppression methods have produced lower noise levels, it is believed that even lower levels are possible.

SUMMARY

Wherefore, it is an object of the present invention to provide a noise suppression system for significantly attenuating the noise produced by jet engines of supersonic aircraft using a new device and method for diverting most of the exhaust flow of the engine to the ambient air for external mixing during take-off and landing of the aircraft.

Wherefore, it is another object of the present invention to provide this noise suppression system which additionally employs internal mixing devices and methods to suppress noise in any portion of the exhaust flow not suppressed using external mixing.

Wherefore, it is yet another object of the present invention to provide this noise suppression system which further suppresses noise by shifting its frequency spectrum higher using devices and methods to separate the exhaust flow into a plurality of exhaust streams having a smaller cross-sectional area.

The foregoing objects have been attained by a noise suppression system for a jet engine of an aircraft having a device for blocking a flow of exhaust gases down the exhaust nozzle of the engine, and a device for separating the exhaust gases into a plurality of exhaust streams spaced a predetermined distance apart and each having a much smaller cross-sectional area than that of the original flow of exhaust gases. The separating device also directs the exhaust streams into the ambient air from points outside the periphery of a nacelle covering the engine. The aforementioned predetermined distance separating the exhaust streams, and the cross-sectional area of the exhaust streams, are chosen so that engine noise is shifted to a higher frequency spectrum than that of the original flow of exhaust gases, and then substantially dissipated within a short distance of the aircraft. The noise suppression system also includes an activation device for placing the system in either a deployed position where the blocking device and separating device are functional, or in a stowed position where the blocking device and separating device are not functional, and the flow of exhaust gases proceeds unimpeded down the exhaust nozzle of the engine.

The blocking and separating devices are preferably disposed forward of a throat of the exhaust nozzle. This has advantages because the speed of the exhaust flow forward of the throat is less than that aft of the throat. This reduces the structural stress on the aforementioned devices. In addition, the upstream placement precludes interference with any area variation mechanisms installed in the divergent section of the exhaust nozzle aft of the nozzle throat.

Preferably, the aforementioned blocking device includes a bypass device for allowing a predetermined portion of the flow of exhaust gases to bypass the blocking device, thereby escaping out a back end of the exhaust nozzle of the engine. This has two advantages. First, it lowers the amount of exhaust that the separating device has to handle, thus allowing the cross-sectional area of the exhaust streams to be smaller. It is advantageous to have smaller openings because the smaller the opening, the higher the frequency spectrum shifts, and the faster the engine noise dissipates. The second advantage is that the exhaust gases escaping out the back end of the exhaust nozzle reduce the aerodynamic drag that otherwise would exist if the flow was completely blocked.

In an engine having a rectangular exhaust nozzle, the noise suppression system according to the present invention has an upper and lower portion corresponding to top and bottom of the exhaust nozzle, respectively. The blocking device of this embodiment includes a pair of blocker plates capable being extended to block the flow of engine exhaust down the exhaust nozzle of the engine whenever the noise suppression system is placed in the deployed position. A first one of the blocker plates is part of the upper portion of the noise suppression system and a second one is part of the lower portion. The blocker plates retract into recesses in the interior surface of the exhaust nozzle whenever the noise suppression system is placed in the stowed position. The separating device of the aforementioned embodiment also has an upper and lower portion. Each of these specifically includes a manifold, a plurality of exhaust struts, and first and second sealing devices. The manifold is used for channeling engine exhaust from the exhaust nozzle. It has an outer end adjacent an opening in the exterior surface of a nacelle of the engine and an inner end adjacent an opening in the interior surface of an exhaust nozzle of the engine. In addition, the manifold includes a plurality of plenums having openings at the outer and inner ends of the manifold, respectively. The plurality of exhaust struts each has at least one flow passage. Whenever the noise suppression system is placed in the deployed position, each of the exhaust strut flow passages has a first open end placed in registration with a one of the openings in the outer end of the manifold and a second open end positioned outside the nacelle and facing the rear of the engine. However, whenever the system is placed in the stowed position, the exhaust struts are retracted into the nacelle. The first sealing device is used to seal the opening in the exterior surface of the nacelle from the outside air whenever the noise suppression system is placed in the stowed position. Whenever the system is deployed, the first sealing means is retracted away from this opening. Similarly, the second sealing device is used to seal the opening in the interior surface of an exhaust nozzle to prevent the escape of exhaust gases into the plenums of the manifold whenever the noise suppression system is placed in the stowed position. When the system is deployed, this second sealing device is retracted away from the opening. As for the activation device of this embodiment, it has an upper and lower portion also. Each portion includes a pair of opposing activation disks. A first one of these disks is disposed at a first side of the engine and a second one is disposed on the other side of the engine. The blocker plate, plurality of exhaust struts, first sealing device and second sealing device are connected to and span between the pair of activation disks in such a way that the simultaneous rotation of the pair of actuation disks in the same direction places these structures in either the deployed position, or the stowed position. And finally, the aforementioned bypass device of this embodiment is a plurality of openings in the blocker plates for allowing a predetermined portion of the flow of exhaust gases to bypass the pair of blocking plates.

Since any exhaust that is allowed to exit from the back end of the exhaust nozzle will produce noise which is not suppressed in any way by the devices described so far, an additional device is employed. At least one blow-in door is included to inject outside air into the interior of the exhaust nozzle aft of the pair of blocker plates. This causes a mixing of the exhaust gases and the outside air, and so a reduction in engine noise.

In order to save on space and hardware, it is desirable that the upper and lower portions of the aforementioned embodiment of the invention installed in a rectangular exhaust nozzle be deployed or stowed together by a single device. Accordingly, it is preferred that the upper portion of the activation device be linked to the lower portion, such that a first actuator can be used to place both portions of the activation device in either the deployed position, or the stowed position, simultaneously. Accordingly, the activation disks in the upper and lower portions of the system would be linked. It is further desirable that the system include a second actuator capable of deploying or stowing the noise suppression system in the event that the first activator fails to do so.

It is also a concern that the noise suppression system not become fixed in the deployed position should the activation device fail completely. Accordingly, it is preferred that the a device be included for retaining the noise suppression system in the deployed position so long as the activation device is functional. The retaining device would allow the noise suppression system to be automatically placed in the stowed position upon a failure of the activation device. Specifically, the force of the engine exhaust on the blocking plates would force the system into the stowed position. The system can only stay deployed as long as the activation device is functional and holds it in the deployed position against the force of the exhaust on the blocker plates.

As can be seen, all the stated objectives of the invention have been accomplished by the above-described embodiments of the present invention. In addition, other objectives, advantages and benefits of the present invention will become apparent from the detailed description which follows hereinafter when taken in conjunction with the drawing figures which accompany it.

DESCRIPTION OF THE DRAWINGS

The aforementioned and other features, aspects, and advantages of the present invention will become better understood with regard to the following description, appended claims, and accompanying drawings where:

FIGS. 3A and 3B are cross-sectional side views of the noise suppression system of FIGS. 1A–B, wherein FIG. 3A illustrates the engine exhaust flow when the system is in the deployed position, and FIG. 3B illustrates the exhaust flow when the system is in the stowed position.

DETAILED DESCRIPTION OF THE PREFERRED EMBODIMENTS

Preferred embodiments of the present invention will now be described with reference to the drawings.

Figure 1A:
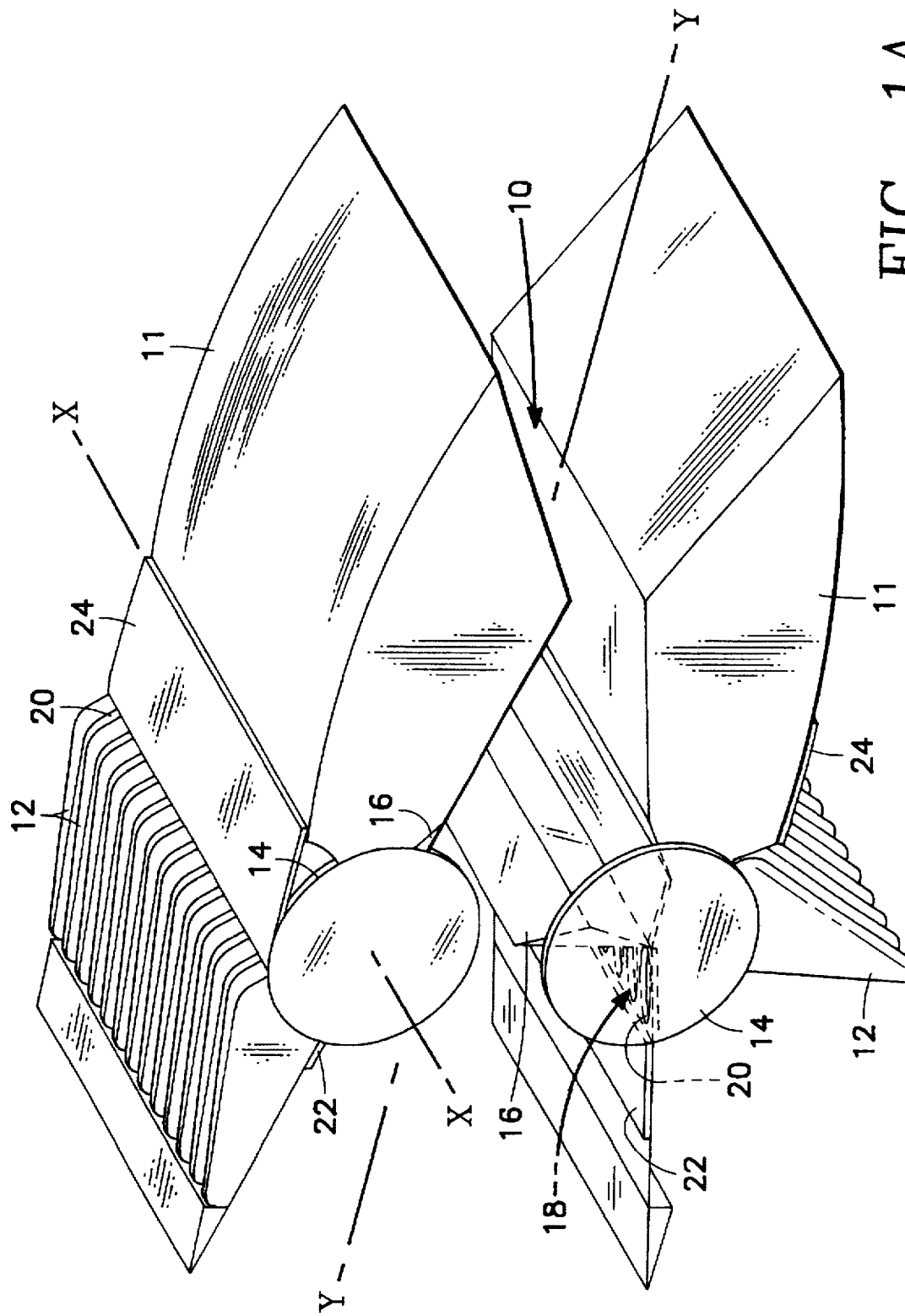
FIGS. 1A and 1B are a perspective view and a partially cross-sectional side view, respectively, of a noise suppression system according to the present invention shown installed in a rectangular exhaust nozzle of a jet engine. The upper portion is shown in a stowed position and the lower portion is shown in a deployed position.
Figure 1B:
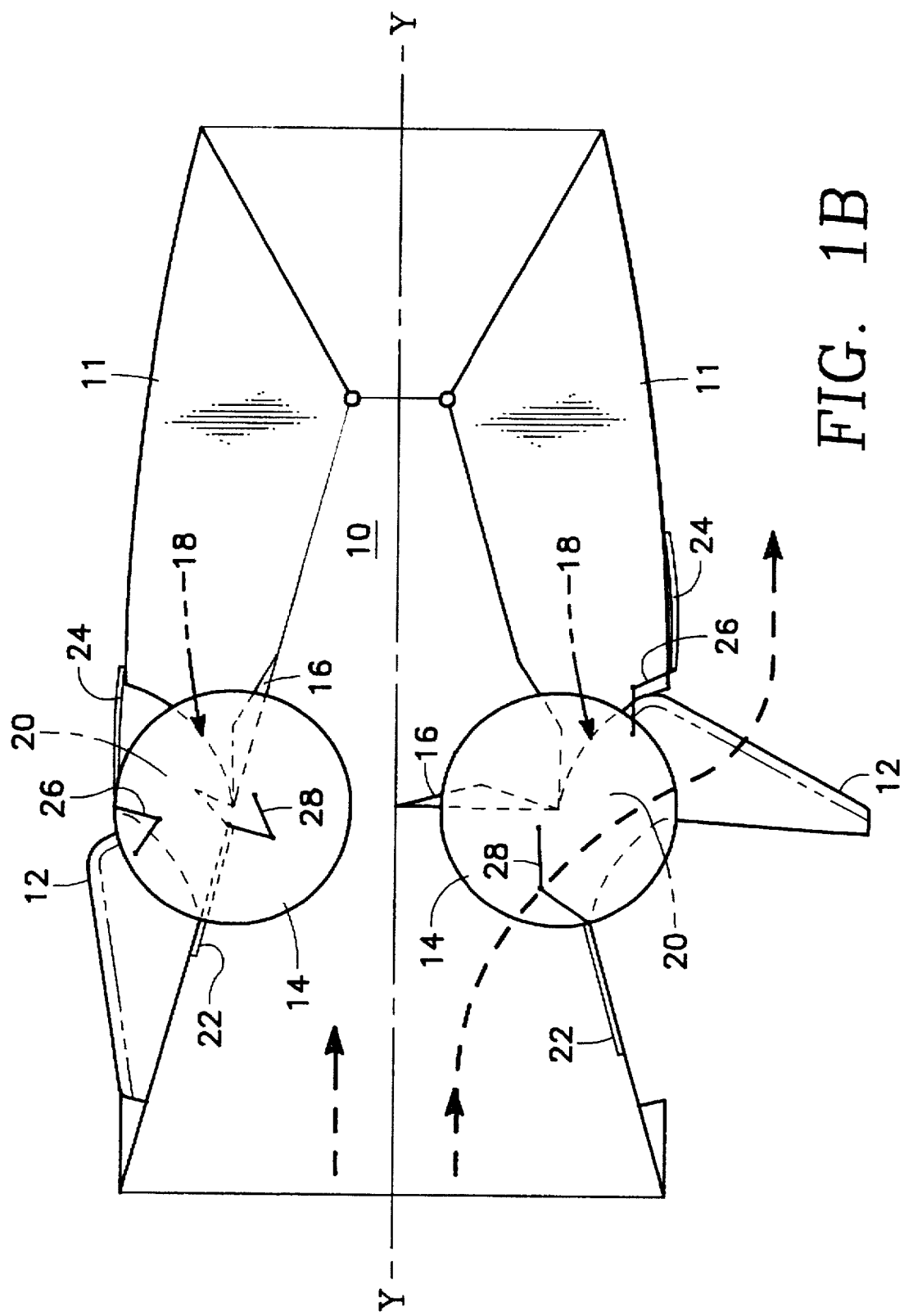

FIGS. 1A–B show a noise suppression system in accordance with the present invention for use during take-off and landing of a supersonic aircraft. The system is shown installed in a jet aircraft engine of the type having a two-dimensional (i.e. rectangular cross-section) exhaust nozzle 10 covered by a nacelle 11. FIG. 1A presents a perspective view of the system and FIG. 1B shows the system in cross-section. To facilitate the description of the noise suppression system, its upper portion is shown in the stowed position, as would be the case during normal cruise operations. Whereas the lower portion is shown in the deployed position, as would be the case during take-off and landing. Of course, in actuality, both the upper and lower portions of the system would be retracted or deployed concurrently.

Two rows of exhaust struts 12, one top and one bottom, are placed linearly within a jet aircraft engine's exhaust structure. The external surface of each strut has an aerodynamic shape similar to the triangular tail fin of an airplane, with its vertical edge facing the front of the engine and its slanted edge facing the rear. The interior of the strut is hollow, with its bottom edge and rearwards facing slanted edge being open. Thus, the interior of the strut forms a flow channel. Each row of struts 12 is attached at its ends to a portion of the periphery of an actuation disk 14. The actuation disks 14 are capable of rotation around points of connection with the side of the adjacent portion of the nacelle 11. This connection point is preferably in the center of each disk 14. The physical dimensions of each strut 12 and the separation between struts 12 in each row depends on the engine into which the noise suppression system is incorporated. These dimensions will be discuss more fully later in connection with an explanation of the noise suppression function of the invention.

A porous blocking plate 16 is also connected between each set of opposing actuation disks 14. One edge of this blocking plate 16, which traverses the space between the disks 14, is coincident with the line X—X connecting the centers of the opposing disks 14. The other traversing edge of the blocking plate 16 extends beyond the edge of the disks 14 such that when the blocking plates 16 of the top and bottom portions of the noise suppression system are deployed, the edges of the respective plates 16 meet, preferably at the centerline Y—Y of the exhaust nozzle 10. The blocker plates 16 are porous due an array of openings (not shown). Preferably, these openings are of sufficient size and number so as to ensure at least approximately 20 percent of the engine exhaust is allowed to pass through the two deployed blocker plates 16 and exit out the end of the engine's nozzle 10. The porosity of the blocker plates 16 serves two purposes. First, it reduces the flow requirements on the exhaust struts 12, thereby limiting their number and physical size. Accordingly, the exhaust struts 12 need only be configured to handle that percentage of the engine exhaust necessary to reduce the engine noise to an acceptable level. In addition, the exhaust flow allowed past the blocker plates 16 prevents the exhaust nozzle 10 from forming a large area of base drag, thereby reducing the efficiency of the aircraft. The blocker plates 16 must be of a shape and thickness which enables them to withstand the force of the exhaust of the engine. As shown in FIGS. 1A–B, the preferred blocker plates 16 have a triangular cross-section with the flat base thereof facing the exhaust flow.

Manifolds 18 exists on the top and bottom of the jet engine's exhaust nozzle 10 adjacent its convergent section. Each manifold 18 contains a series of plenums 20 which have openings facing the interior of the exhaust nozzle 10 and the exterior of the nacelle 11. The end of each plenum 20 facing the exterior of the nacelle 11 corresponds to the opening in the bottom of an adjacent exhaust strut 12, when the struts 12 are in their deployed position. Accordingly, a series of continuous flow channels is formed between the interior of the exhaust nozzle 10 and the exterior of the aircraft via the manifold plenums 20 and exhaust struts 12.

The aforementioned openings in the manifold plenums 20 are sealed during normal cruise operations, i.e. when the noise suppression system is stowed, to prevent escape of the exhaust flow from the upstream portion of the exhaust nozzle 10. The sealing is accomplished by two sliding plates which extend across the nozzle between the actuation disks 14. The first of these is a pressure plate 22 which seals the portion of the manifold 18 facing the interior of the exhaust nozzle 10. The other is a cover plate 24 which seals the portion of the manifold 18 facing the exterior of the nacelle 11. The pressure plate 22 interfaces with the interior surface of the exhaust nozzle 10 such that it is capable of sliding along this surface toward the front of the engine. Similarly, the cover plate 24 interfaces with the exterior surface of the nacelle 11 such that it is capable of sliding along this surface toward the back of the engine. The pressure plate 22 and cover plate 24 are extended to seal the manifold 18 when the noise suppression system is stowed, and retracted away from the manifold 18 when the system is deployed, by linking both ends of the plates to the respective adjacent actuation disks 14 via linkage mechanisms 26, 28. The plates 22, 24 are linked in such a way as to cause them to be slid away from the manifold 18 when the actuation disks 14 are rotated to deploy the system, and to be slid back over the manifold 18 when the actuation disks 14 are rotated in the opposite direction to stow the system. Any appropriate linkage mechanism can be employed to accomplish this task, and as such does not constitute a novel feature of the present invention. Accordingly, a detailed description will not provided herein.

Figure 2:
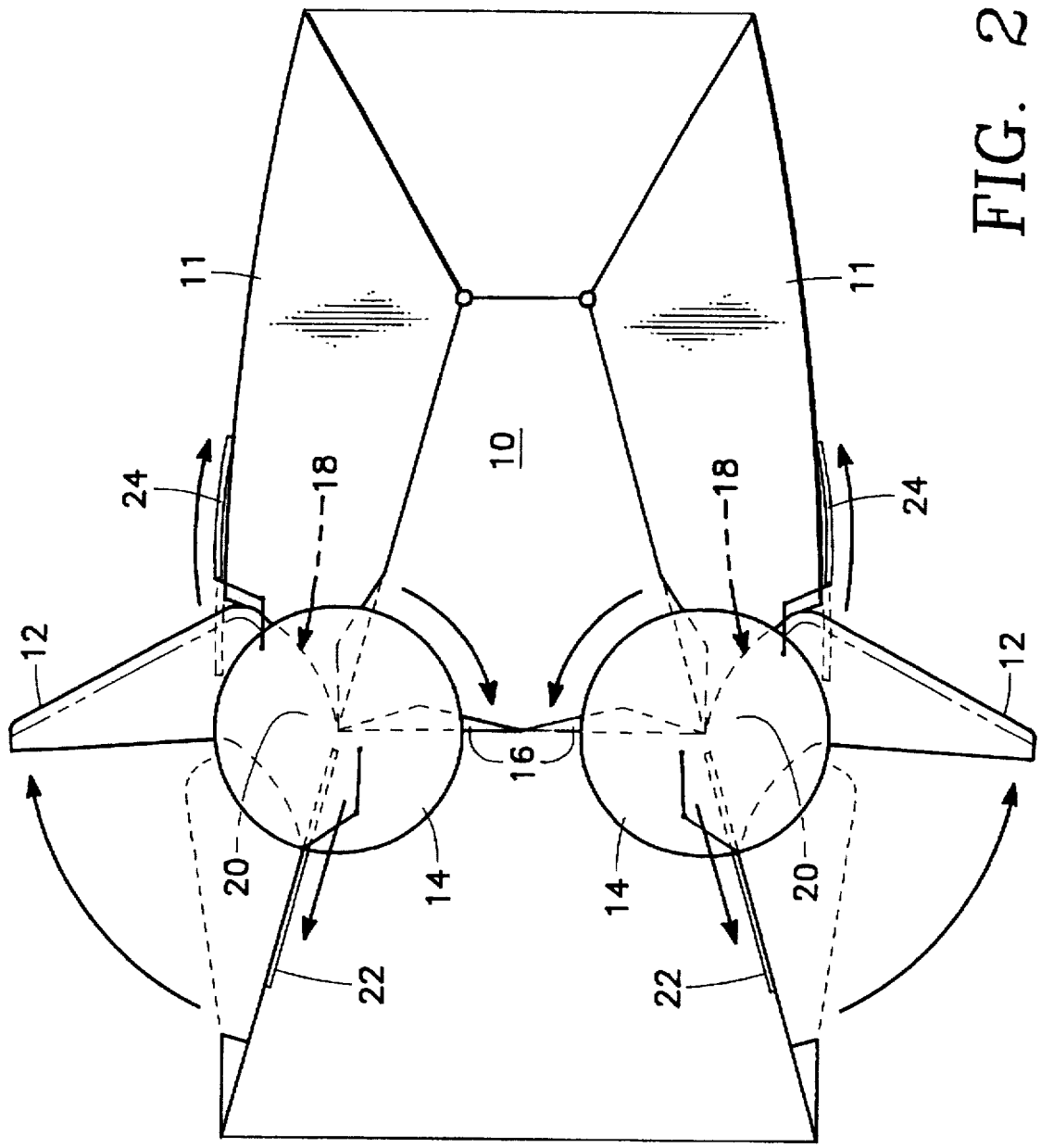
FIG. 2 is a partially cross-sectional side view of the noise suppression system of FIGS. 1A–B showing the various positions of components making up the system, beginning in the stowed position (dashed lines) and finishing in the deployed position (solid lines).

The noise suppression system is deployed and stowed via rotation of the actuation disks 14. Viewed from the perspective of FIG. 2, it can be seen that a clockwise rotation of the opposing actuation disks 14 in the upper portion deploys the system. Whereas, deployment requires a counterclockwise rotation of the actuation disks 14 in the lower portion of the system. The system is stowed by reversing the aforementioned rotation directions of the actuation disks 14. FIG. 2 is an illustration of the deployment process of the noise suppression system according to the present invention. As the actuation disks 14 are rotated in the directions described above, several things occur simultaneously. The internal pressure plates 22 move forward and expose the portions of the upper and lower manifolds 18 facing the interior of the exhaust nozzle 10. The external cover plates 24 move aft exposing the downstream end of the manifolds 18. The porous blocker plates 16 move down into the exhaust flow forming an aft pressure wall. And finally, the upper and lower sets of exhaust struts 12 are rotated into registration with the plenums 20 of the manifolds 18.

Figure 3A:
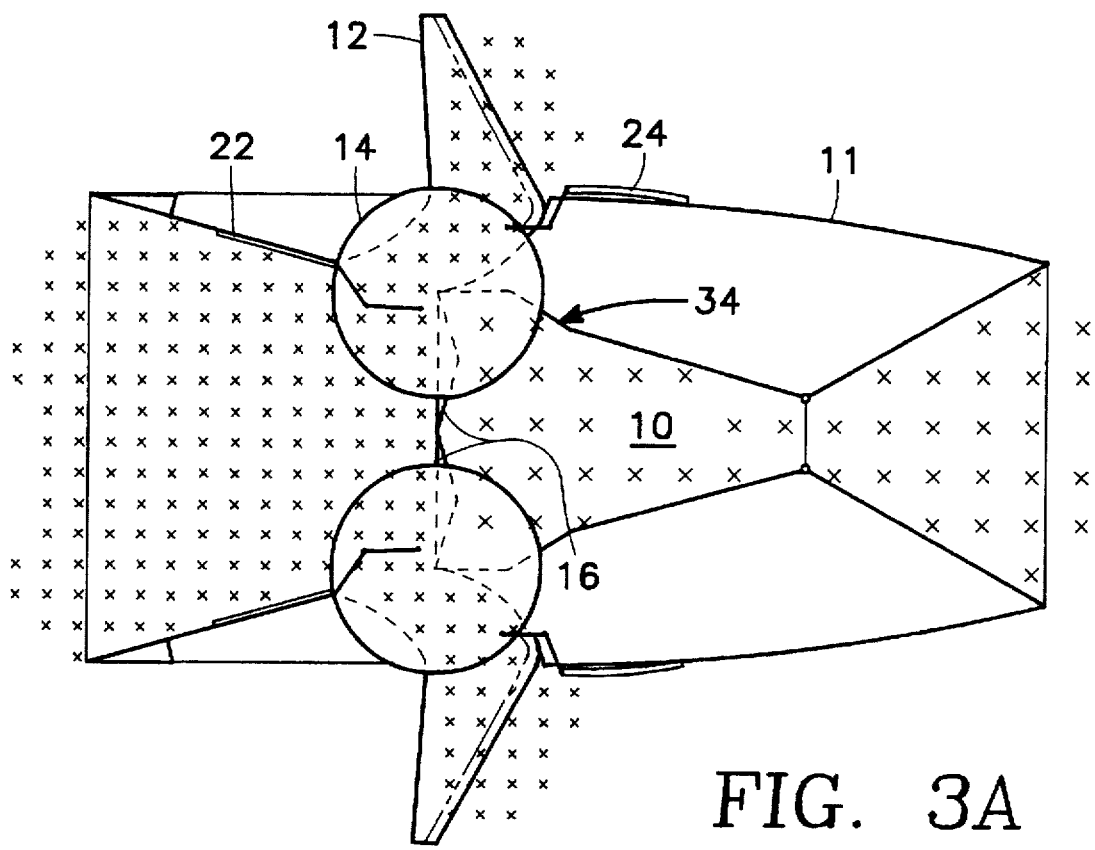

With the noise suppression system in the deployed position, the blocker plates 16 force most of the exhaust flow from the engine through the manifold plenums 20 and out the exhaust struts 12. Only that portion of the exhaust escaping through the openings in the blocker plates 16 exits through the back end of the exhaust nozzle 10. FIG. 3A shows this just-described exhaust flow pattern, as it would appear with the noise suppression system deployed during take-offs and landings. However, during normal cruise operation the noise suppression system is rotated into the stowed position, and an exhaust flow pattern such as that seen in FIG. 3B, is exhibited.

Figure 3B:
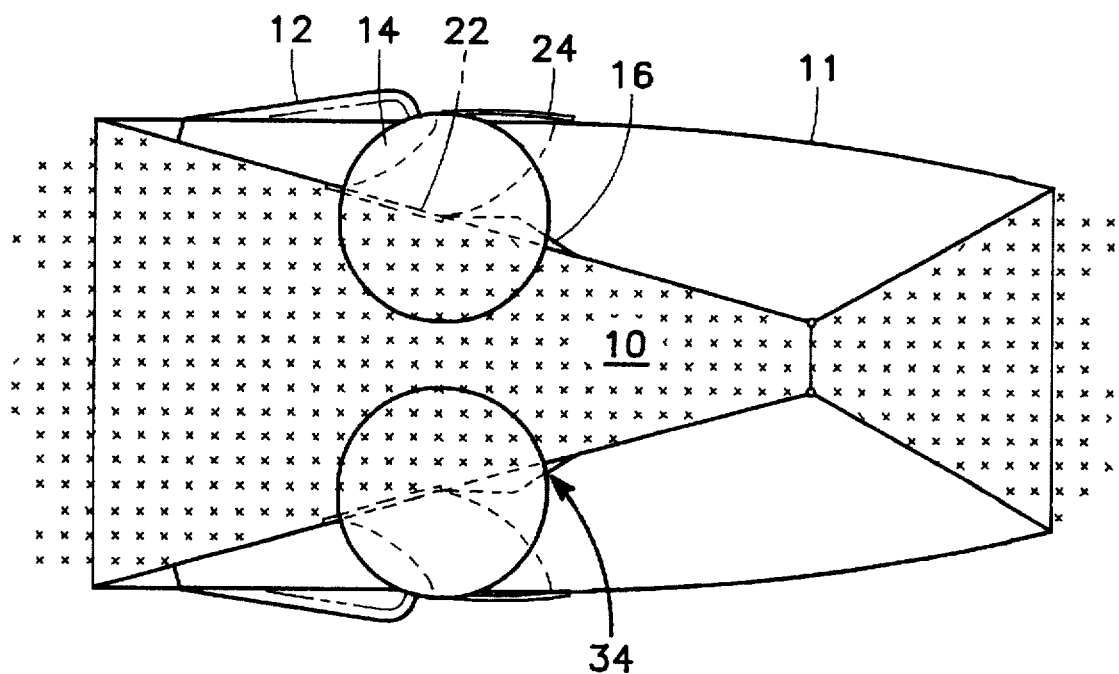

It is also noted in reference to the FIG. 3B that the exhaust struts 12 are for the most part retracted into the nacelle housing 1 1. That part of the exhaust struts 12 that projects above the exterior surface of the nacelle 11, as well as the manifold cover plate 24, have aerodynamic shapes such that the flow of air over the nacelle 11 is not significantly affected by their presence. The exact aerodynamic shapes that would produce this effect are well known and not a novel part of the present invention, so will not be further described herein. In addition, the blocker plates 16 are retracted into an inset 34 (best seen in FIG. 3A) in the internal pressure wall of the exhaust nozzle 10. This inset 34 is shaped so that the blocker plates 16 fit completely within, thereby leaving the flat side of each plate 16 flush with the interior surface of the exhaust nozzle 10. The blocker plates 16 are made flush so that the exhaust flow is not appreciably disturbed during the cruise mode. For the same reason, the pressure plates 22 and actuation disks 14 are preferably shaped so that any protrusion into the exhaust flow is minimized.

The above-described mechanism operates to suppress jet engine noise because the engine exhaust flow is separated into many smaller flows by the manifold plenum and exhaust strut pathways. This causes mixing of the exhaust with the air outside the aircraft to occur over a much shorter physical dimension than would be the case with an unseparated exhaust flow. In addition, the openings in the rearwards facing slanted edges of the exhaust struts 12 have a much smaller area than the end of the exhaust nozzle 10. These two factors combine to shift the exhaust noise spectrum to a higher frequency range which is attenuated rapidly through the atmosphere. Accordingly, noise levels away from the immediate vicinity of the aircraft are reduced to an acceptable level.

Since the key to the noise suppression afforded by the present invention derives from separating the exhaust flow into smaller streams and the size of the exhaust strut openings, the distance separating the struts 12 from each other and their physical size is critical. In regards to the separation between adjacent struts 12, the distance between the centerline of each strut's external opening is chosen such that the exhaust flow from each strut 12 does not significantly re-combine with adjacent flows before mixing with the outside air. This ensures the exhaust streams are truly separated. As discussed previously, the size of the external exhaust strut openings must be small enough to shift the noise spectrum to a higher frequency. However, these openings must also be large enough to handle the required flow of engine exhaust that is channeled through them. Accordingly, there must be a sufficient number of exhaust struts 12 having external strut openings large enough so that the total area of all the external openings is adequate to handle the required exhaust flow for the chosen engine. Ideally, as many struts 12 as possible are employed, so that the external openings can be as small as possible for noise suppression purposes. The number of struts 12 is limited by the physical width of the jet engine and the necessity to maintain sufficient separation between struts 12 to prevent the aforementioned recombination of the exhaust flows. Therefore, the preferred number of struts 12 would be the maximum that will fit over the width of the engine, top and bottom, and still have the necessary inter-strut separation. Obviously, the thinner a strut 12 is, the more that will fit in the space described above. Therefore, it is also preferred that the struts 12 have a width which is no larger than that necessary to provide walls thick enough to withstand the aerodynamic forces encountered when deployed and the force of the exhaust being forced through them, along with a reasonable external opening width. A reasonable external opening width is a width which is as narrow as possible, but not so narrow that in order to obtain the necessary opening size to handle the exhaust, the struts 12 have to be excessively high in terms of fitting within the nacelle 11 in the stowed position or creating significant aerodynamic drag in the deployed position. It is noted that the other physical dimensions of the struts 12 are chosen to provide the previously described aerodynamic external shape and a flow channel capable of transferring the necessary exhaust flow from the manifold plenum 20 to the external opening of the strut.

Figure 4:
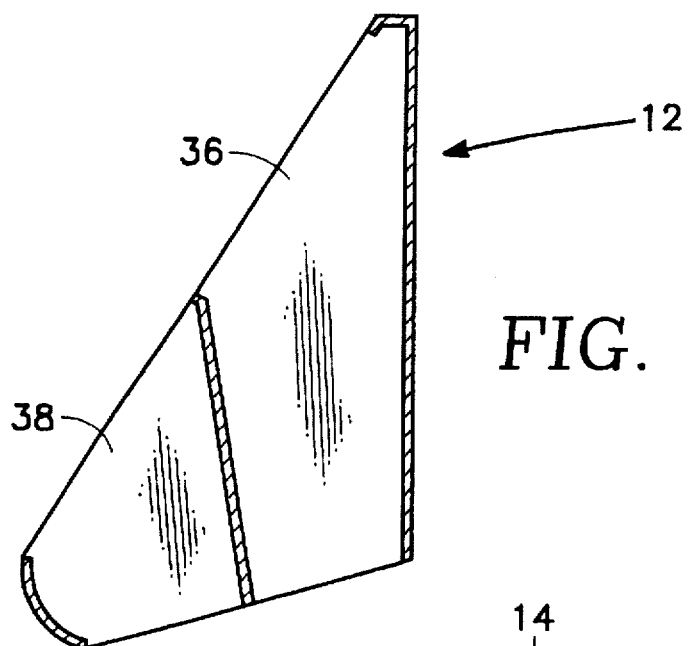
FIG. 4 is a cross-sectional side view of an alternate exhaust strut configuration of the noise suppression system of FIGS. 1A–B, showing two flow channels instead of one.

It is possible that the above-described strut design criteria would lead to a situation where the external opening are too large to obtain a sufficiently high noise frequency spectrum to ensure adequate noise suppression. Such a situation might occur where a large amount of exhaust flow must be handled by the struts 12 and the width of the engine precludes incorporating enough struts 12 to allow for a sufficiently small external strut opening. In these cases, the frequency spectrum can be increase by subdividing each external strut opening into multiple openings having a smaller area. For instance, as shown in FIG. 4, the struts 12 could be constructed so that each contained two channels 36, 38, one on top of the other, which when placed in registration with a manifold plenum, produces two vertically adjacent exhaust flows at its two external openings.

Figure 5:
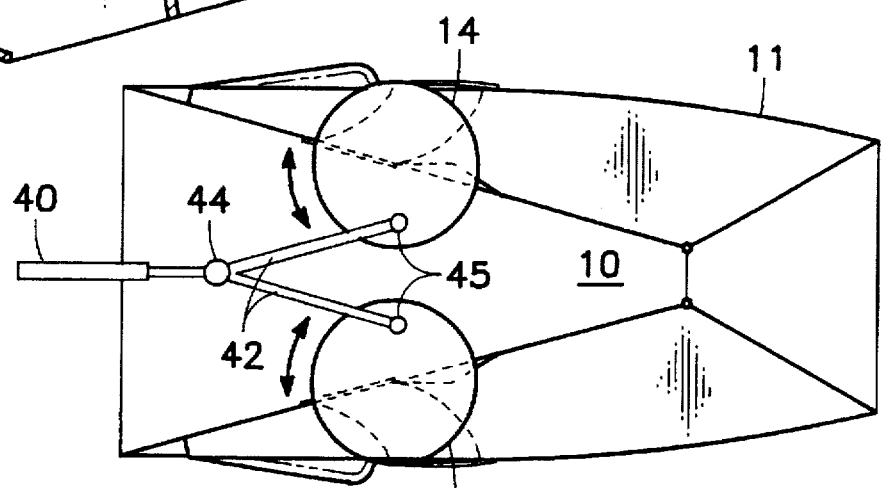
FIG. 5 is an illustration of an actuator mechanism linking the upper and lower actuation disks of the noise suppression system of FIGS. 1A–B.

It is further preferable that the upper and lower actuation disks 14 on each side of the noise suppression system are linked together. This allows both upper and lower portions of the system to be deployed or stowed via a common actuator. Of course, as explained previously, the disks 14 would have to be linked in such a way that the upper disk is driven in a rotational direction opposite from the lower disk. FIG. 5 shows an example of how the actuator disks 14 could be linked together. In this example, an linear-motion actuator 40 is connected to a first end of two links 42. The other end of one of the links 42 is connected to the upper actuation disk 14, while the other link 42 is similarly connected to the lower actuation disk 14 on the same side of the engine. Preferably, the links 42 are attached to the side of the actuator disks 14 facing the exterior of the engine. In addition, the actuator 40 and links 42 are preferably located in an interior portion of the nacelle on the sides of the engine outside of the nozzle. This configuration keeps the actuator 40 and links 42 out of the nozzle's interior where they could interfere with the exhaust flow. The connection point 44 between the actuator 40 and the links 42, as well as the connections 45 between the links 42 and the actuator disks 14, are preferably rotatable. The rotatable connections 44, 45 facilitate the operation of the actuator structure, as well now be described.

In operation, the actuator 40 is fully extended when the noise suppression system is in the stowed condition. To activate the noise suppression system, the actuator 40 is retracted until the actuator disks 14 have rotated sufficiently to fully extend the system. The actuator 40 rotates the upper actuation disk 14 in the clockwise direction, and the lower actuation disk 14 is driven in the counterclockwise direction. The links 42 are connected to the actuator disks 14 at a point thereon which causes the necessary rotation when the actuator 40 is retracted. Similarly, the actuator 40 is chosen so that it is capable of a linear excursion which will allow the necessary rotation when the links 42 are connected to some point on the actuator disks 14. As the disks 14 are circular in shape, the links 42 must be allowed to rotate about their connections at both ends as the actuator 40 is retracted. Thus, the need for the aforementioned rotatable connection points 44, 45. The noise suppression system is stowed by extending the actuator 40 the same distance it was retracted to deploy the system. This causes the links 42 to rotate the actuator disks 14 in the opposite directions (i.e. counterclockwise for the upper disk 14, and clockwise for the lower disk 14), thereby retracting the system.

The linkage of FIG. 5 is presented as an example only, and the present invention is not intended to be limited to such a linkage. Any appropriate linkage could be used in its stead.

It is also preferable that the upper and lower actuation disks 14 on each side of the engine be linked, and connected to separate actuators 40, as described above. By providing an independent drive supply at each end of the system, a redundancy is established. Thus, in the case that one of the actuating mechanisms fails, the other can still deploy and stow the noise suppressor system. To this end, it is preferred that either actuator be capable of extending and retracting the noise suppression system on its own. The two actuating mechanisms can be synchronized via well known synchronization methods, and operated simultaneously. Alternately, one mechanism can be employed as a primary and the other as a backup. In the latter case, the back-up mechanism actuator would be operated only if the primary mechanism failed. Otherwise, it would be disconnected, or placed in a mode wherein it simply follows the motions of the primary actuating mechanism.

The noise suppression system according to the present invention, once deployed, is held in place by the force of the actuator(s) 40 on the actuation disks 14. Thus, the actuator(s) 40 and associated the linking mechanism must be sufficient to withstand the force of the exhaust against the blocker plates 16. This method of using the actuating mechanism to hold the noise suppression system in the deployed position has a distinct advantage. Should the actuating mechanism, or mechanisms, fail, the force of the exhaust against the blocker plates 16 will cause the noise suppression system to rotate into its stowed position. Accordingly, the system fails in the cruise mode. By failing in this cruise mode, the aircraft can still take-off and land safely, albeit at a higher noise level.

Figure 6:
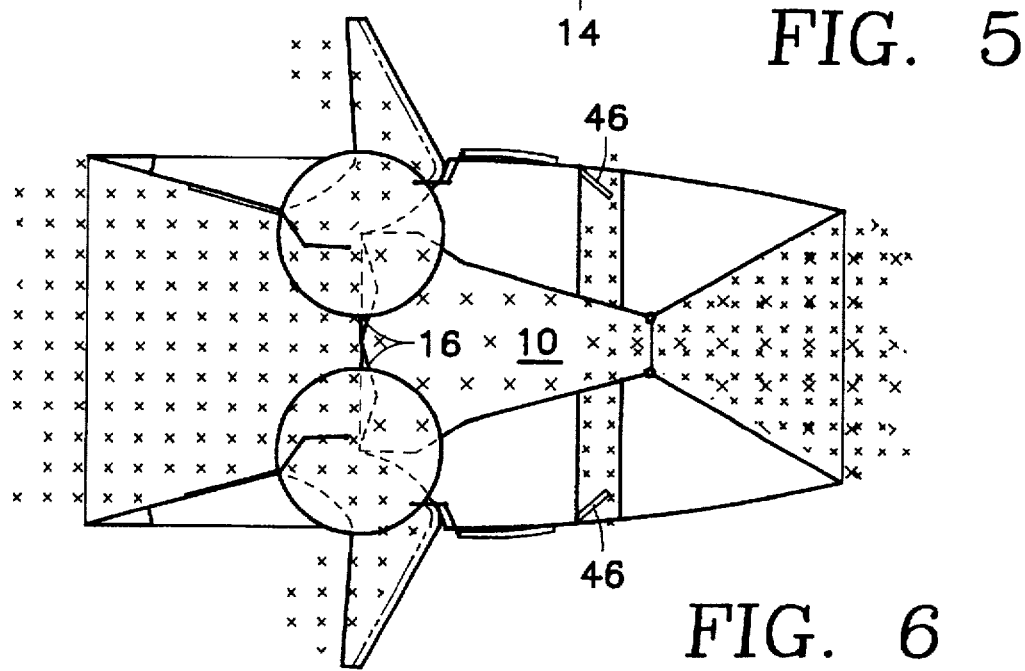
FIG. 6 is a cross-sectional side view of the noise suppression system of FIGS. 1A–B showing two blow-in auxiliary flow doors installed aft of the blocker plates.

As discussed previously, allowing part of the exhaust flow to pass through the porous blocking plates has the advantage of reducing the exhaust flow requirement of the exhaust struts and preventing the back end of the nozzle from becoming a significant source of aerodynamic drag. However, this exhaust flow also becomes a source of noise. This noise is preferably suppressed. As shown in FIG. 6, the noise suppression is accomplish by the addition of blow-in auxiliary flow doors 46 located aft of the porous blocker plates 16. These doors 46 introduce outside air into the exhaust flow. The resulting internal mixing within the nozzle 10 suppresses engine noise by dissipating it before the exhaust leaves the nozzle 10.

Another advantage of a noise suppression system in accordance with the present invention is that it is located upstream of the exhaust nozzle throat so as to allow a lower mach flow through the manifold 18 and exhaust struts 12. This reduces the structural requirements for the components of the system. In addition, the noise suppression system is clear of the area variation mechanisms located in the aft section of the exhaust system. Thus, any potential interference with these mechanisms is avoided.

While the invention has been described in detail by reference to the preferred embodiments described above, it is understood that variations and modifications thereof may be made without departing from the true spirit and scope of the invention. For example, the noise suppression system of the present invention could be easily adapted for use in jet engines having circular cross-sectional exhaust nozzles.

Wherefore, what is claimed is:

1. A noise suppression system for a jet engine of an aircraft, comprising:
   (a) a blocking apparatus for blocking a first portion of a flow of exhaust gases flowing down an exhaust nozzle of the engine; and,
   (b) a separating device for separating the first portion of the flow of exhaust gases blocked by the blocking apparatus into multiple streams of exhaust gases spaced a predetermined distance apart, and for directing the streams of exhaust gases from points outside of a nacelle covering the engine towards a rear of the engine; and wherein,
   (c) the predetermined distance separating the streams of exhaust gases and a cross-sectional area of the streams of exhaust gases are chosen so that noise generated by the engine and carried by the exhaust gases is shifted to a higher average frequency than that of the original flow of exhaust gases; and
   (d) an injection apparatus for injecting outside air into the interior of the exhaust nozzle aft of the blocking apparatus to cause a mixing of a remaining portion of the flow of exhaust gases not blocked by the blocking apparatus with the outside air.

2. The noise suppression system of claim 1, further comprising:
   an activation device for one of (i) deploying said blocking apparatus, separating device and injection apparatus into a deployed position wherein the blocking apparatus blocks the first portion of the flow of exhaust gases, the separating device separates the first portion of the flow of exhaust gases into multiple streams of exhaust gases and the injection apparatus injects outside air into the interior of the exhaust nozzle aft of the blocking apparatus, or (ii) stowing said blocking apparatus, separating device and injection apparatus into a stowed position wherein said blocking apparatus does not block the first portion of the flow of exhaust gases, said separating device does not separate the first portion of the flow of exhaust gases into multiple streams and said injection device does not inject outside air into the interior of the exhaust nozzle aft of the blocking apparatus, thereby allowing the flow of exhaust gases to proceed unimpeded down the exhaust nozzle of the engine.

3. The noise suppression system of claim 2, wherein the exhaust nozzle of the engine is a rectangular exhaust nozzle and the noise suppression system has an upper portion and a lower portion located at the top and bottom of the exhaust nozzle, respectively, and wherein the blocking apparatus comprises:
   a pair of blocker plates capable of being extended into the interior of the exhaust nozzle to block the first portion of the flow of exhaust gases down the exhaust nozzle of the engine whenever the blocking apparatus is placed in its deployed position, a first one of the blocker plates being a part of the upper portion of the noise suppression system and a second one of the blocker plates being a part of the lower portion, said blocker plates further being retractable into recesses formed in the interior surface of the exhaust nozzle whenever the blocking apparatus is placed in its stowed position.

4. The noise suppression system of claim 3, wherein the separating device comprises an upper separating device portion and a lower separating device portion located within to the upper and lower portions of the noise suppression system, respectively, each separating device portion comprises:
   (a) a manifold for channeling engine exhaust gases from the exhaust nozzle, said manifold comprising an outer end adjacent an opening in the exterior surface of a nacelle of the engine and an inner end adjacent an opening in the interior surface of an exhaust nozzle of the engine, said manifold further comprising a plurality of plenums having openings at the outer and inner ends of the manifold, respectively;
   (b) a plurality of exhaust struts each comprising at least one flow passage, each flow passage having a first open end placed in registration with a one of the openings in the outer end of the manifold and a second open end positioned outside the nacelle and facing the rear of the engine whenever the noise suppression system placed in the deployed position, said plurality of exhaust struts being retractable into the nacelle whenever the noise suppression system is placed in the stowed position;

(c) first sealing cover capable of sealing the opening in the exterior surface of the nacelle from the outside air whenever the noise suppression system is placed in the stowed position, said first sealing means being retractable away from the opening in the exterior surface of the nacelle whenever the noise suppression system is placed in the deployed position; and, (d) second sealing cover capable of sealing the opening in the interior surface of an exhaust nozzle to prevent the escape of exhaust gases into the plenums of the manifold whenever the noise suppression system is placed in the stowed position, said second sealing means being retractable away from the opening in the interior surface of the exhaust nozzle whenever the noise suppression system is placed in the deployed position.

5. The noise suppression system of claim 1, wherein the blocking apparatus comprises:

a device for allowing the remaining portion of the flow of exhaust gases to bypass the blocking apparatus.

6. The noise suppression system of claim 3, wherein the pair of blocking plates comprises:

a plurality of openings for allowing the remaining portion of the flow of exhaust gases to bypass the pair of blocking plates.

7. The noise suppression system of claim 6, wherein the injection apparatus comprises:

at least one blow-in door capable of opening to route outside air into the interior of the exhaust nozzle aft of the pair of blocker plates whenever the injection apparatus is placed in its deployed position, and capable of closing to prevent outside air from entering into the interior of the exhaust nozzle aft of the pair of blocker plates whenever the injection apparatus is placed in its stowed position.

8. The noise suppression system of claim 4, wherein the activation device comprises:

(a) a first actuator; and, (b) an upper activation device portion and a lower activation device portion associated with the upper and lower portions of the noise suppression system, respectively, the upper activation device portion and the lower activation device portion being linked to one another and to their respective associated portions of the noise suppression system and to the first actuator, such that the first actuator is capable of simultaneously driving both the upper and lower activation device portions which in turn are capable of driving the respective upper and lower portions of the noise suppression system so as to place the blocking apparatus, separation device, and injection apparatus into one of (i) the deployed position, or (ii) the stowed position.

9. The noise suppression system of claim 8, wherein the activation means further comprises:

a second actuator linked to the upper and lower activation device portions, said second actuator being capable of simultaneously driving both the upper and lower activation device portions which in turn are capable of driving the respective upper and lower portions of the noise suppression system so as to place the blocking apparatus, separating device and injection apparatus into one of one of (i) the deployed position or (ii) the stowed position, in conjunction with or independently of the first actuator.

10. The noise suppression system of claim 9, wherein each one of the upper and lower activation device portions comprises:

a pair of opposing activation disks, a first one of which is disposed at a first side of the engine and a second one of which is disposed on the other side of the engine, and wherein said blocker plate, plurality of exhaust struts, first sealing cover and second sealing cover are connected to and span between said pair of activation disks such that the simultaneous rotation of the pair of actuation disks in the same direction places the blocker plate, plurality of exhaust struts, first sealing cover and second sealing cover in a position corresponding to one of (i) the deployed position of the blocking apparatus, separating device and injection apparatus, or (ii) the stowed position of the blocking apparatus, separating device and injection apparatus.

11. The noise suppression system of claim 2, wherein the activation device comprises:

apparatus for retaining the blocking apparatus, separating device and injection apparatus in the deployed position so long as the activation device is in a working condition, said retaining apparatus allowing the blocking apparatus, separating device and injection apparatus to be automatically placed in the stowed position upon a failure of the activation device.

12. The noise suppression system of claim 1, wherein:

the blocking apparatus, separating device, and injection apparatus are disposed forward of a throat of the exhaust nozzle, thereby precluding interference with any area variation mechanisms installed in a divergent section of the exhaust nozzle aft of the nozzle throat.

13. A method of noise suppression for a jet engine of an aircraft using a noise suppression system, comprising the steps of:

(a) blocking a first portion of a flow of exhaust gases flowing down an exhaust nozzle of the an engine;

(b) separating the first portion of the flow of exhaust gases into a multiple streams of exhaust gases spaced a predetermined distance apart; and, (c) directing the streams of exhaust gases from points outside of a nacelle covering the engine towards a rear of the engine; such that, (d) the predetermined distance separating the streams of exhaust gases and a cross-sectional area of the streams of exhaust gas are chosen so that noise generated by the engine and carried by the exhaust gases is shifted to a higher average frequency than that of the original flow of exhaust gases; and (e) injecting outside air into the interior of the exhaust nozzle aft of a point where the first portion of the exhaust gases is blocked to cause a mixing of a remaining portion of the flow of exhaust gases not blocked with the outside air.

14. The method of noise suppression according to claim 13, further comprising the steps of:

placing the noise suppression system in one of (i) a deployed position wherein the first portion of the exhaust gases is blocked and separated into multiple streams of exhaust gases which are in turn directed from points outside the nacelle towards a rear of the engine, and the remaining portion of the flow of exhaust gases is simultaneously mixed with the outside are injected into the interior of the exhaust nozzle during take-off and landing of the aircraft, or (ii) a stowed position wherein the exhaust gases are not blocked, separated, directed from points outside the nacelle to the rear of the engine, or mixed with outside air injected into the interior of the exhaust nozzle, thereby allowing the flow of exhaust gases to proceed unimpeded down the exhaust nozzle of the engine.

15. The method of noise suppression according to claim 14, wherein the step of placing the noise suppression system in one of (i) a deployed position, or (ii) a stowed position comprises the step of:

retaining the noise suppression system in the deployed position so long as the noise suppressed system is in a working condition, and allowing the noise suppression system to be automatically placed in the stowed position upon a failure of the system.

16. The method of noise suppression according to claim 13, wherein:

the noise suppression system is disposed forward of a throat of the exhaust nozzle, thereby precluding interference with any area variation mechanisms installed in a divergent section of the exhaust nozzle aft of the nozzle throat.

\* \* \* \* \*